Oct. 9, 1962 R. S. HOLDSWORTH 3,057,831
SUSPENSION POLYMERIZATION OF VINYL CHLORIDE AND PRODUCT THEREOF
Filed Nov. 29. 1957

PVC Beads

Commercial Resin

Aging Time: Weeks in Water at 50°C
PVC Beads In Wire Insulation

INVENTOR.
Robert S. Holdsworth
BY Oliver W. Hayes
Wilfred J. Baranick

United States Patent Office 3,057,831
Patented Oct. 9, 1962

3,057,831
SUSPENSION POLYMERIZATION OF VINYL CHLORIDE AND PRODUCT THEREOF
Robert S. Holdsworth, Needham, Mass., assignor to Escambia Chemical Corporation, Pace, Fla., a corporation of Delaware
Filed Nov. 29, 1957, Ser. No. 699,599
11 Claims. (Cl. 260—78.5)

This invention relates to the production of polymers and more particularly to the production of polymers and copolymers of vinyl halides. This application is a continuation-in-part of my previous application bearing Serial No. 633,649, filed January 11, 1957, now abandoned.

A principal object of the present invention is to provide a process for producing polymer beads or spheroidally-shaped granular particles having an unusually large uniform particle size.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention reference should be had to the following detailed description taken in connection with the accompanying drawing wherein.

Figure 1:
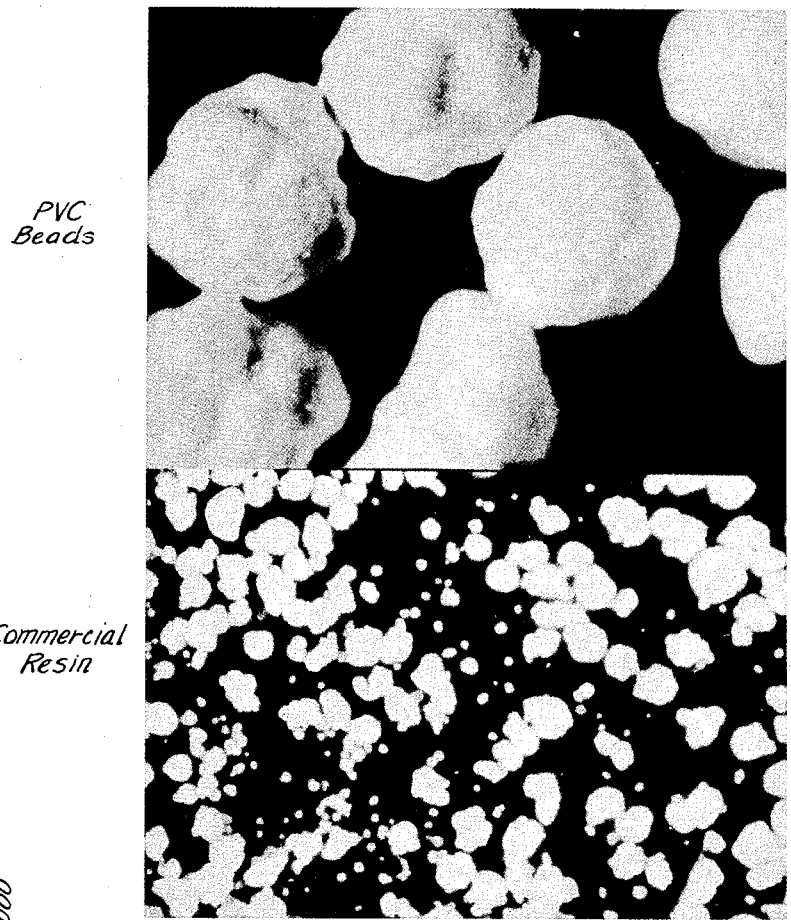
FIG. 1 is a microphotograph comparing vinyl chloride polymer beads produced according to the present invention and current commercially available resin.

Vinyl compounds can be polymerized in any one of the following four manners (a) bulk, (b) solution, (c) emulsion, and (d) suspension. These polymerization processes will be initially described in connection with vinyl chloride. In bulk polymerization of vinyl chloride the polymer particles produced often agglomerate into large masses or cakes. This results in some difficulty in removing the polymer from the reaction vessel and necessitates additional treatment of the polymer such as grinding, pulverizing and the like.

In solution polymerization of vinyl chloride, the finished polymer must be separated from the solvent and a solvent recovery step must be included in a commercial operation. The polymer particles produced in a solvent polymerization are usually small and dusty and generally undesirable.

In emulsion polymerization, relatively large amounts of emulsifiers, wetting agents and catalysts are employed. The polymer particles produced are of very fine size and remain dispersed in the polymerization medium. An additional step is required to recover the dispersed polymer. The wetting agents and catalysts are frequently left mixed with the polymer, resulting in deterioration of such physical properties as heat resistance and electrical resistivity.

The polymers of vinyl chloride produced by suspension polymerization are of granular form. In the process, vinyl chloride is suspended and polymerized in water with a minimum of additives such that upon completion of the reaction the polymer produced settles out of the water. The physical properties of the dry resin are therefore not impaired by the presence of large amounts of wetting agents and catalysts.

Heretofore, the polymer particles recited to be produced by suspension processes ranged in size from somewhat larger than those produced by emulsion processes to several hundred microns or larger. The process of the present invention is particularly directed to the production of polymer beads which are of a generally large and uniform size not heretofore achieved.

The process of the present invention comprises polymerizing a vinyl halide or copolymerizing a vinyl halide with either (a) a vinyl ester, (b) an allyl ester, or (c) an ester of maleic or fumaric acids at a pH below about 7.0 while dispersed in an aqueous medium containing a salt of a metal selected from the group consisting of magnesium, calcium, strontium, zinc, cadmium, barium, aluminum, tin, lead, antimony, titanium, and zirconium, and a surface active agent selected from the group consisting of the salts of organic sulfonates and organic sulfates. The process of the present invention is particularly well adapted to the polymerization of vinyl chloride and to the copolymerization of vinyl chloride with either a vinyl ester, an allyl ester, or an ester of maleic or fumaric acids.

Surface active agents as mentioned above have been employed both in emulsion and suspension polymerizations. However, the use of such agents often results in a polymer of very small particle size. Likewise many metallic polyvalent salts have been utilized in producing polymers of vinyl compounds. In the prior art metallic salts have been utilized as (a) buffers, (b) coagulants, and (c) stabilizers. While many inorganic or metallic salts have been used in the prior art to stabilize the pH of the polymerizing system, an effect upon the particle size of the resulting polymeric material was not recognized or observed. Metallic salts have also been extensively employed to coagulate the polymer latex produced by emulsion polymerization techniques. Again the use of these metallic salts did not affect the particle size of the polymeric material produced. Incorporation of various metallic salts into plasticized masses of polymers of vinyl compounds affect the heat, light, and electrical properties of the polymer. However, these metallic stabilizers usually constitute an after treatment of the produced polymer and in no way affect its particle size or shape. The present invention is the first to describe, recognize and appreciate the fact that certain metallic salts when used in conjunction with certain surface active agents in a suspension polymerization of certain vinyl compounds result in the production of substantially uniform, large size polymer beads.

Specific detailed methods of practicing the present invention are set forth in the following non-limiting examples.

EXAMPLE I

A mixture of 100 parts by weight of vinyl chloride, 230 parts of demineralized water, 0.2 part lauroyl peroxide, 0.05 part 85% phosphoric acid, 0.1 part Nacconol NRSF (alkyl benzene sodium sulfonate) and 0.1 part monobasic calcium phosphate was agitated and heated in a 300 gallon glass-lined autoclave at a temperature of about 50° C. The pH of the aqueous suspension was 3.2 while the pressure at the start of the polymerization reaction was about 100 pounds per square inch gauge. The atmosphere over the suspension was oxygen free. The reaction was discontinued after the reactor pressure had decreased by 40 pounds per square inch in approximately 16.5 hours. A conversion of 85–90 percent was obtained. The polyvinyl chloride produced after separation from the aqueous medium by means of centrifugation was washed and dried. The dried polymer has a large uniform particle size about five times as large as a conventional suspension grade polyvinyl chloride resin, as shown by the following screening analysis:

| | Percent |
|---|---|
| Retained on 40 mesh screen | 81 |
| Retained on 80 mesh screen | 16 |
| Retained on 100 mesh screen | 1 |
| Retained on 200 mesh screen | 1 |

The polymer beads prepared above have excellent plasticizer absorption. Cold blending of 100 parts of the above obtained polymer with 50 parts of dioctyl phthalate, 2.5 parts of barium-cadmium stabilizer, 1.25 parts of an epoxy stabilizer and 0.5 part stearic acid gave no appearance of wetness. Dry blending is usually obtained only at elevated temperatures of as high as 200–210° F. The plasticized polymer or resin has the following properties:

| | |
|---|---|
| Tensile, p.s.i. | 2325 |
| 100% modulus | 1365 |
| Elongation, percent | 375 |
| Hardness, Shore A | 90 |
| Fish eyes (milled sheet) | None |

EXAMPLE II

A mixture of 100 parts by weight of vinyl chloride, 224 parts of demineralized water, 0.2 part lauroyl peroxide, 0.06 part Nacconol NRSF (alkyl benzene sodium sulfonate) and 0.06 part lead acetate was agitated and heated in a 5 gallon glass-lined autoclave at a temperature of about 50° C. The pH of the aqueous suspension was 5.8 while the pressure at the start of the polymerization reaction was about 100 pounds per square inch. The atmosphere over the suspension was oxygen free. The reaction was terminated after 16 hours at a pressure drop of 40 pounds per square inch. The polymer after separation from the aqueous medium was dried and gave the following screen analysis:

| | Percent |
|---|---|
| Retained on 40 mesh screen | 90 |
| Retained on 80 mesh screen | 9 |
| Retained on 100 mesh screen | 0.4 |
| Retained on 200 mesh screen | 0.6 |

As in Example I, the polymer beads readily absorbed plasticizer and a dry blend was obtained at room temperature.

EXAMPLE III

A mixture of 100 parts by weight of vinyl chloride, 200 parts of demineralized water, 0.2 part lauroyl peroxide, 0.1 part Aerosol OT (dioctyl sodium sulfosuccinate) and 0.1 part barium chloride was charged to a 28 ounce glass bottle and heated at 50° C. while rotating end over end for 16 hours. The pH of the suspension was about 3.6. A polymer with excellent plasticizer absorption characteristics was obtained. The screening analysis was similar to those illustrated above, i.e., over 90 percent of the polymer beads produced were retained on 80 mesh or coarser screens.

EXAMPLE IV

A series of runs were made employing 100 parts by weight of vinyl chloride, 200 parts demineralized water, 0.2 part lauroyl peroxide and varied amounts of Nacconol NRSF (alkyl benzene sodium sulfonate) and calcium acetate. The polymerizations were carried out at a temperature of about 50° C. for 16 hours. The pH of the suspension in all cases was on the order of about 5.6.

| Run number | Parts per 100 Parts Monomer | | | | | | |
|---|---|---|---|---|---|---|---|
| | A | B | C | D | E | F | G |
| Nacconol NRSF | 0.10 | 0.05 | 0.06 | 0.05 | 0.05 | 0.02 | 0.02 |
| Calcium Acetate | 0.10 | 0.10 | 0.06 | 0.05 | 0.02 | 0.05 | 0.02 |
| Suspension Quality | Good | Good | Good | Good | (¹) | Good | (¹) |
| Percent Polymer Retained on Screen of 80 Mesh or Coarser | >90 | >90 | >90 | >90 | | >90 | |

¹ Flocculated.

100 parts of polymer beads from runs A, B, and D were each cold blended with 50 parts of dioctyl phthalate, 2.5 parts of a barium-cadmium stabilizer, 1.25 parts of an epoxy stabilizer and 0.5 part stearic acid. The plasticized polymers or resins had the following properties:

| | A | B | D |
|---|---|---|---|
| Tensile, p.s.i. | 2,200 | 2,100 | 2,980 |
| 100% Modulus | 625 | 625 | 1,560 |
| Elongation, Percent | 360 | 290 | 350 |
| Hardness, Shore A | 80 | 80 | 85 |
| Heat Resistance: Minutes to Blacken at 200° C | 45 | 45 | 60 |

EXAMPLE V

A copolymer of vinyl chloride (90%) and vinyl acetate (10%) was prepared as above on 0.10 part of Nacconol NRSF (alkyl benzene sodium sulfonate), 0.10 part monobasic calcium phosphate and 0.2 part lauroyl peroxide. A copolymer of large, uniform particle size was obtained with a screen analysis similar to those shown in the above examples.

EXAMPLE VI

A copolymer of vinyl chloride (85%) and dibutyl maleate (15%) was prepared as above on 0.10 part Nacconol NRSF (alkyl benzene sodium sulfonate), 0.1 part monobasic calcium phosphate and 0.2 part lauroyl peroxide. A copolymer of large, uniform particle size was obtained. The screen analysis was similar to those shown in the above examples.

EXAMPLE VII

Polymers similar to those obtained in the above examples were prepared from 100 parts by weight of vinyl chloride, 200 parts of water, 0.2 part lauroyl peroxide with the following wetting agent-inorganic salt combinations:

| Metal Salt | Amt. | Wetting Agent | Amt. | pH | Average Particle Size |
|---|---|---|---|---|---|
| A. Calcium Chloride | 0.10 | Nacconol NRSF [1] | 0.10 | 3.7 | In each case over 90% of the produced polymer was retained on 80 mesh or coarser screening. |
| B. Barium Acetate | 0.20 | ----do [1] | 0.20 | 5.9 | |
| C. Barium Acetate | 0.05 | ----do [1] | 0.05 | 5.2 | |
| D. Magnesium Sulfate | 0.05 | ----do [1] | 0.05 | 3.3 | |
| E. Zinc Sulfate | 0.05 | ----do [1] | 0.05 | 3.6 | |
| F. Lead Acetate | 0.05 | ----do [1] | 0.05 | 4.9 | |
| G. Cadmium Acetate | 0.05 | ----do [1] | 0.05 | 5.1 | |
| H. Cadmium Sulfate | 0.05 | ----do [1] | 0.05 | 3.5 | |
| I. Stannous Sulfate | 0.05 | ----do [1] | 0.05 | 2.4 | |
| J. Calcium Acetate | 0.05 | Ultrawet K [2] | 0.05 | 5.2 | |
| K. Calcium Acetate | 0.05 | Ultrawet DS [3] | 0.05 | 5.4 | |
| L. Calcium Acetate | 0.05 | Ultrawet 60-L [4] | 0.05 | 5.6 | |
| M. Aluminum Phosphate | 0.1 | Duponol ME [5] | 0.10 | 3.6 | |
| N. Barium Chloride | 0.1 | Aerosol OT [6] | 0.10 | 3.6 | |

[1] Nacconol NRSF—Alkyl benzene sodium sulfate.
[2] Ultrawet K—Alkyl aryl sodium sulfonate—high molecular weight.
[3] Ultrawet DS—Alkyl aryl sodium sulfonate—medium molecular weight.
[4] Ultrawet 60-L—Organic salt of an alkyl aryl sulfonate.
[5] Duponol ME—Fatty alcohol sodium sulfate.
[6] Aerosol OT—Dioctyl sodium sulfosuccinate.

EXAMPLE VIII

The polyvalent cation is required to produce the large size polymer beads described above. In this example, the polyvalent cation was omitted and the reaction mixture consisted of only 100 parts by weight of vinyl chloride, 200 parts of water, 0.2 part lauroyl peroxide and 0.1 part Nacconol NRSF. The polymerization was carried out at 50° C. for 16 hours in the same manner as described in the above examples. A flocculated or agglomerated product resulted.

Several additional runs were then carried out systematically varying the wetting agent from 0.05 to 3.00 parts per 100 parts of vinyl chloride. In all cases, only agglomerated products were obtained thus showing that the wetting agent alone was not sufficient to produce the desired large size beads.

EXAMPLE IX

The procedure of Example VIII was repeated with the addition of 0.1 part sodium acetate to the suspension. Again only agglomerated products were obtained. This showed that a polyvalent cation was required to produce the polymer beads described in the above examples.

EXAMPLE X

Other wetting agents such as salts of fatty acids and nonionic wetting agents were used as replacements for the organic sulfonates or sulfates. 100 parts by weight of vinyl chloride, 200 parts of water, 0.2 part lauroyl peroxide, 0.1 part calcium acetate were mixed with:

(A) 0.1 part sodium stearate
(B) 0.1 part Triton X-100 (alkylaryl polyether alcohol)

and polymerized as above.

In (A) and (B), agglomerated products resulted. Thus, the sulfonates or sulfates are necessary in the practice of this invention.

EXAMPLE XI

The pH at which the polymerization is carried out is very important. A series of runs employing both a preferred wetting agent and metallic salt were carried out at various pH levels. At pH above 7.0 only agglomerated resins or products were obtained. At pH below 7.0 and preferably below 6.5, the desired large size polymer beads were obtained. At a pH below 7.0 little decrease in the particle size of the polymer is noticed; however, an appreciable decrease in the bulk density of the polymer is observed.

| pH: | Bulk density (lb./cu. ft.) |
|---|---|
| 6.6 | 32.4 |
| 6.0 | 28.2 |
| 4.5 | 18.2 |
| 3.1 | 15.7 |

As clearly illustrated in the examples, the present invention produces substantially uniform large size polymer beads which are chemically and physically homogeneous. This is achieved only by the use in combination of a novel stabilizing system and a pH below 7.0. Although the particle size is larger than conventional, the polymer beads process easily since they readily absorb plasticizer when preblended at room temperature to yield a dry mixture as shown below.

The polyvinyl chloride beads readily dissolved in organic solvents such as cyclohexanone and tetrahydrofuran, while heat is usually required to dissolve conventional vinyl chloride resins. In addition, the polymer beads are dust free and handling losses are low as compared with dust-like or powder resins. The large size polymer beads present fewer fabrication problems whereas the fine powdery type presents many difficulties.

The polymers of the instant invention are characterized by an unusually large, uniform particle size. This is clearly illustrated by a comparison of the particle size as determined by screen analysis of the present polyvinyl chloride polymer as shown in the examples with two widely accepted commercial polyvinyl chloride resins which were probably prepared by suspension processes and which are shown in Table 1 below.

*Table 1*

| Screen Analysis, Percent Retained on | Resin A | Resin B |
|---|---|---|
| 20 Mesh Screen | 0 | 0 |
| 40 Mesh Screen | 0 | 1 |
| 80 Mesh Screen | 26 | 3 |
| 100 Mesh Screen | 54 | 20 |
| 140 Mesh Screen | 17 | 47 |
| 200 Mesh Screen | 2 | 21 |
| Through 200 Mesh | 0 | 9 |

The absence of very small particles or fines in the present polymer eliminates such problems as dust and reduces material loss in storage and processing. While the absence of dust is important, the other desirable properties of this resin are of greater importance.

The polymer bead particles appear to be smooth, uniform spheres when examined without magnification. However, photomicrographs have shown that the polymer beads of the instant invention actually have a rough, pitted surface. Thus, while the size is large, the effective surface area is also large, due to the submicroscopic irregularity of the particles. This is confirmed by absorption studies.

In FIGURE 1, a photomicrograph of the polymer beads is compared with a photomicrograph of the suspension polymers. The large particle size, uniformity, and the absence of dust are evident. The surface roughness indicates that the particles are quite porous.

A great deal of the polyvinyl chloride resin produced is used in applications which require a flexible material. This flexibility is achieved by the incorporation of suitable plasticizers. It is frequently convenient to pre-blend the resin and the plasticizer. The mixture is then heated and a dry blend should be obtained.

An acceptable resin is capable of absorbing the required amount of plasticizer and yield a dry blend on heating. The dry blend must also possess sufficient dryness to flow through lines or be blown through a conveying system without caking or otherwise interfering with the processing operation.

The heating time required to produce resin-plasticizer dry blends and the flow properties of these blends are studied. The resin and plasticizer were blended in a mixer. A steam jacket was built on the bowl of this mixer and the temperature of the bowl was held at 100° C. during the test. The mixer was operated at the slowest speed. The dry blend time is defined as the time required to produce a dry resin-plasticizer mixture while the bowl is held at 100° C. A comparison of the dry blend times of the present polymer bead with two commerical resins reported to have outstanding dry blend qualities was made and is shown in Table 2.

*Table 2*

| Resin | Parts Dioctyl Phthalate per Hundred Resin | Dry up Time, Minutes | Dry Blend Flow Rate, grams/ second |
|---|---|---|---|
| PVC Beads | | | 9.1 |
| PVC Beads | 30 | 0 | 8.4 |
| PVC Beads | 50 | 3 | 6.2 |
| PVC Beads | 70 | 5 | 4.5 |
| PVC Beads | 90 | 11 | 4.4 |
| PVC Peads | 100 | 14 | 4.0 |
| PVC Beads | 120 | 85 | 3.8 |
| PVC Beads | 150 | 180 | 3.4 |
| A | | | 7.7 |
| A | 30 | 1 | 6.7 |
| A | 50 | 4 | 3.2 |
| A | 70 | 5 | 2.9 |
| A | 90 | 15 | 2.3 |
| A | 100 | 100+ | 0.0 |
| B | | | 5.0 |
| B | 30 | 5 | 0.0 |
| B | 50 | 5 | 0.0 |

The polymer bead resin is about equivalent to the best commercial resins in its ability to quickly absorb 50 parts of dioctyl phthalate per 100 parts of polymer. However, only the polymer beads would absorb 100 parts of dioctyl phthalate and yield a dry blend in this test.

In addition to good plasticizer absorption, the resulting dry blends should flow readily. The flow times of resin-plasticizer blends through a 60° stainless steel funnel having a one-half inch opening were measured. In Table 2, these flow times of polyvinyl chloride bead dioctyl phthalate dry blends are shown to be good, even at extremely high plasticizer levels. One of the conventional resins is seen to flow fairly well at moderate dioctyl phthalate levels, while the other fails to flow even at the low dioctyl phthalate level. Only the polymer beads of the instant invention produce dry blends with high and relatively constant flow rates over wide dioctyl phthalate variations.

Polymeric plasticizers are frequently used in polyvinyl chloride compounding. Paraplex G–50, a polymeric plasticizer compatible with polyvinyl chloride resins, was dry blended with the polymers as above. The dry up times are shown in Table 3.

*Table 3*

| Resin | Parts Paraplex G–50 per Hundred Resin | Dry up Time, Minutes | Dry Blend Flow Rate, grams/ second |
|---|---|---|---|
| PVC Beads | | | 9.1 |
| PVC Beads | 30 | 1 | 10.0 |
| PVC Beads | 50 | 5 | 10.0 |
| PVC Beads | 70 | 40 | 10.0 |
| PVC Beads | 100 | 60 | 0.0 |
| A | | | 7.7 |
| A | 30 | 1 | 7.7 |
| A | 50 | 6 | 7.7 |
| A | 70 | 60+ | 0.0 |

The dry blends containing the polymeric plasticizer flow even better than those containing dioctyl phthalate at low plasticizer content. However, the flow of the dry blends containing the polymeric plasticizer fail to flow at all in our test when the polymeric plasticizer exceeds 90 parts per hundred parts of the polymer beads. However, other commercial resins studied failed to flow at considerably lower polymeric plasticizer levels. Thus, while the polymer bead resin absorbs the polymeric plasticizer, even in relatively large amounts, the dry up times are longer than with dioxtyl phthalate and the total amount which can be absorbed is limited.

In summation, the flow properties of dry blends made from the polymer beads of the instant invention are outstanding. Superior rates of flow at all plasticizer levels are observed, and it is possible to incorporate a great deal more plasticizer without fusing or caking the resulting dry blend. The large, uniform particle size is believed to be partly responsible for these excellent flow properties, as there is little or no fine material to pack between the larger particles. Also, the larger size presents a smaller surface available for particle to particle contact and possible adhesion.

Polyvinyl chloride bead compounds may be processed in equipment normally used in the manufacture of plastic articles. Polymer bead plasticizer dry blends were prepared and these dry blends were extruded as a strip from a 2½ inch extruder having an L.D. ratio of 20/1. Other polyvinyl chloride resin-plasticizer dry blends were prepared and also extruded as a strip. The extrusion rates of all compounds were measured and are shown in Table 4.

*Table 4*

Extrusion Rate, pounds per hour
PVC beads _____ 30.5
Resin A _____ 32.4
Resin B _____ 20.7
Compound:
   Resin _____ 100.0
   Dioctyl phthalate _____ 40.0
   Epoxy plasticizer _____ 9.6
   Cadmium octoate _____ 2.0
   Stearic acid _____ 0.2
Extruder screw, rotation _____r.p.m__ 12

Although differences in the extrusion rates were observed in the test reported in Table 4, it was also found that the temperatures of the extruder and the speed of the screw changed the rates more than the differences between the resins which were studied. Thus, the rate of extrusion of all the resins tested are believed to be equivalent within the accuracy of the above test. The color and clarity of the extruded tape from the polymer bead compound were particularly good, and there was no evidence of imperfections.

The polyvinyl chloride bead was mixed in an internal mixer and calendered into film using a number one-four roll inverted L 8 x 16-inch calender. This film was free of gelled particles or "fisheyes" and again exhibited unusually good color and clarity. This film was heat sealed with standard radio frequency heat sealing equipment. The bonds were stronger than the film. The polymer beads can be extruded, milled or calendered in conventional plastics processing equipment.

A large amount of polyvinyl chloride resin is used for the insulation of wire. Good electrical insulative properties, wide color range, ease of production and low cost are factors which make vinyl insulation attractive.

The value of a polyvinyl chloride resin in electrical applications is best determined by preparing an electrical compound and actually insulating wire. The insulation resistance is measured while the wire is immersed in water. It is desirable to test over an extended period of time to account for such factors as aging, shrinkage, leaching and water absorption.

High molecular weight polymer beads were compounded to give an electrical stock of the following composition: This compound was extruded on #14 copper wire at about 300 feet per minute in a 1/32 inch insulation.

Figure 2:
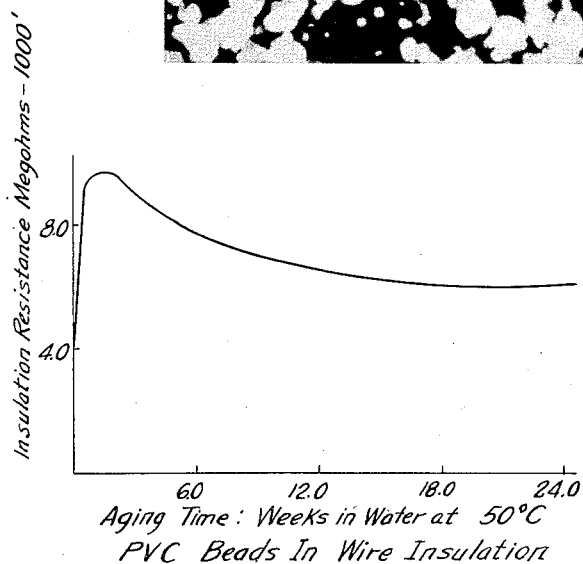
FIG. 2 is a graph of the electrical insulating properties of the polymer beads of the instant invention.

The wire made using the polymer beads was immersed in water at 50° C., and the insulation resistance was measured over a period of 24 weeks. The results of this test are shown in FIG. 2. The insulation resistance of the polymer bead compound is quite constant during the testing period, indicating that the compound has good aging qualities. The equilibrium insulation resistance of 6.5 megohms-1,000 feet is well above the Underwriters' requirements of 0.1 megohm-1,000 feet.

Aging studies also showed that the polymer bead insulation compound retained 94% of its original elongation after aging seven days at 113° C., while the retention of elongation of a high grade commercial polyvinyl chloride resin was only 88% in the same test.

The good insulating properties of compounds based on the polymer bead, together with the outstanding dry blending and flow qualities noted above suggest that this resin is ideal for electrical applications.

The polyvinyl chloride bead polymers are particularly well suited for rigid applications. A low molecular weight polymer bead is usually preferred, as plasticizers are excluded or used at very low levels and optimum processing properties are required. The polyvinyl chloride low molecular weight beads were stabilized with 3% of dioctyl tin mercaptide and milled on a 16-inch differential speed mill at 177° C. The compound was found to band quickly and a smooth, rolling bank was obtained. The heat stability of the compound was outstanding compared to commercial polymers as shown in Table 5. The physical properties were determined and all the compounds studied were found to be equivalent.

Table 5

|  | Low M.W. PVC Beads | Resin C | Resin D |
| --- | --- | --- | --- |
| Relative Viscosity 1% in cyclohexanone at 30° C. | 2.10 | 2.14 | 1.84 |
| Milled at 177° C., Time to Discolor, Minutes | 90 | 40 | 30 |
| Heat Distortion Temperature, ° C., Fiber Stress of 66 p.s.i. | 80 | 80 | ---------- |
| Heat Distortion Temperature, ° C., Fiber Stress of 264 p.s.i. | 75 | 75 | 74 |
| Izod Impact, ft. lb./inch of notch | 0.82 | 0.88 | 0.70 |

The stabilizing system of the present invention is comprised of (a) a surface active agent selected from the group consisting of the salts of organic sulfonates and organic sulfates and (b) a salt of a polyvalent metal selected from the group consisting of magnesium, calcium, strontium, zinc, cadmium, barium, aluminum, tin, lead, antimony, titanium, and zirconium. In general, it is found that the anionic surface active agents such as organic sulfate or sulfonate salts are more desirable to use with the selected metal salt to produce the desired polymer beads.

The use of either a salt of an organic sulfate or sulfonate alone as the dispersing agent produced agglomerated polymers. This is illustrated in Example VIII above. The use of other surface active agents such as fatty acid salts also resulted in flocculated or agglomerated products as shown in Example X. Examples of suitable surface active agents include high molecular sulfate salts and mono and dialkyl substituted aryl hydrocarbons such as the alkyl naphthalene sulfonic acids, disobutyl naphthalene sodium sulfonate, decyl benzene sodium sulfonate, sodium disulfonate or dibutyl phenyl phenol, isopropyl naphthalene sodium sulfonate, dioctyl sodium sulfosuccinate, sodium lauryl sulfate, sodium tetradecyl sulfate, sodium pentadecyl sulfate, sodium octyl sulfate, as well as others of the above type which are well known. In place of sodium other salts may be used, for example, the potassium, ammonium or lithium salts.

The amount of surface active agent used is desirably maintained between about 0.02 to about 0.20 part for every 100 parts of polymerizable compound employed. In determining the amount to be employed in any particular run, the amount of preferred metallic salt must be also considered.

In addition to the surface active agent, the polymerization stabilizing system also comprises a salt of a polyvalent metal selected from the group consisting of magnesium, calcium, strontium, zinc, cadmium, barium, aluminum, tin, lead, antimony, titanium and zirconium. Examples of suitable metallic salts are calcium acetate, calcium chloride, cadmium acetate, cadmium sulfate, barium acetate, lead acetate, magnesium sulfate, zinc sulfate, aluminum phosphate, titanium sulfate, zirconium sulfate and the like. Alkali metal salts such as sodium acetate resulted in agglomerated products. The combination of a preferred metal salt with a salt of an organic sulfate or sulfonate results in an entirely novel type of stabilizing system for vinyl compound polymerization.

Although the wetting efficiency of, for example, the alkali metal organic sulfates and sulfonates is somewhat reduced by the presence of the preferred metallic salts, the production of a resin with large, uniform particle size is obtained by a careful control of the amounts of each component of the stabilizing system. The amount of metallic salt used is desirably maintained between about 0.02 and about 0.20 part for every 100 parts of polymerizable compound employed. However, the particular amount to be employed is somewhat dependent on the amount of wetting agent also to be employed. When 0.02 part of wetting agent is used, at least 0.05 part of a preferred metallic salt is also used. The particular amounts of each component of the stabilizing system used is quite critical. Amounts of surface active agents much in excess of those shown result in the production of a polymer of very small particle size. Amounts of surface active agent and metallic salt below those shown result in agglomerated polymers.

Not only must the above-mentioned stabilizing system be employed to obtain the desired size polymer beads but also the polymerization must be carried out at a pH below 7.0 and preferably below about 6.5. Polymerizations carried out at pH above about 7.0, even in the presence of the preferred stabilizing system, resulted in agglomerated resins. For purposes of adjusting the pH of the polymerization system such acids as phosphoric acid, acetic, hydrochloric, sulfuric and the like can be used.

Polymerization temperatures of between about 30° C. and 70° C. have been found to be most suitable. The polymerization time varies considerably depending upon such factors as the temperatures employed, catalysts, amounts of catalyst, etc. The polymerization is generally continued until substantially complete or until more than about 80% of the polymerizable compounds are converted to polymer. The completion of the polymerization is indicated by a pressure drop in the reactor. The reaction times are usually in excess of 12 hours when conducted at 50° C. The pressure employed can be varied. However, it must be sufficient to maintain the polymerizable compounds in the liquid phase while dispersed in the aqueous medium.

Organic peroxides, azo compounds, redox systems and the like can be used in the process as catalysts. Suitable organic peroxides are lauroyl peroxide, benzoyl peroxide, chlorobenzoyl peroxide, capryl peroxide, myristyl peroxide, acetyl peroxide, stearoyl peroxide, acetylbenzoyl peroxide, tertiary butyl hydroperoxide, phthalyl peroxide, succinyl peroxide and the like. Good results are obtained when between about 0.05 to about 0.5 part of catalyst is used per 100 parts of polymerizable compound. The polymerization is carried out in a liquid which is immiscible with the polymerizable compounds, i.e., the liquid medium is a nonsolvent for the compound or compounds to be polymerized. Water is the preferred suspension medium. The amount of water in which the polymerization is to be effected is preferably maintained between about 1.5 to 5 times the amount of polymerizable compounds used. The suspension is agitated or stirred during the polymerization. While the beads will settle out on termination of the agitation, the suspension is usually pumped as a slurry for the operation of filtration or centrifugation used to separate the polymer beads from the aqueous medium. The recovered beads can then be washed with water if desired and then dried.

The present process is applicable to those polymerizable compounds selected from the group consisting of vinyl halides and mixtures of a vinyl halide with (a) a vinyl ester, (b) an allyl ester, (c) an ester of maleic acid, and (d) an ester of fumaric acid. Vinyl chloride and copolymers thereof are particularly well suited to the instant process. Vinyl esters of organic acids such as vinyl acetate; dialkyl esters of maleic acid or fumaric acid such as diethyl or dibutyl maleate; and allyl esters such as allyl acetate, when copolymerized with, for example, vinyl chloride, according to the instant process, produce the desired large uniform polymer. The concentration of the vinyl ester, allyl ester, or ester of maleic or fumaric acid in the polymerization mixture can be varied considerably. However, concentrations from about a few tenths of a percent to about 20 percent by weight of the polymerization mixture have been found to be most suitable.

As illustrated in the examples, over 90% of the produced polymer was retained on screens of 80 mesh or coarser. This clearly illustrates the large particle size of the polymer. The range of particle size is quite narrow and not extended over a wide range as found in the prior art.

Since certain changes may be made in the above process without departing from the scope of the invention herein involved, it is intended that all matter contained in the above description should be interpreted as illustrative and not in a limiting sense.

What is claimed is:
1. The process of producing substantially uniform, discrete, large particle size spheroidally-shaped granular polymer particles, of a size of at least 80 mesh as produced, which comprises polymerizing by suspension polymerization a polymerizable compound selected from the group consisting of vinyl chloride and mixtures of at least 80 percent by weight vinyl chloride with a member selected from the group consisting of (a) a vinyl ester of a lower fatty acid, (b) an allyl ester of a lower fatty acid, and (c) a dialkyl ester of maleic and fumaric acids, at a temperature between about 30° C. and 70° C. and at a pH below about 7.0 while suspended in an aqueous medium containing an oil-soluble free-radical polymerization catalyst, an ionizable polyvalent metal salt soluble in said aqueous medium and an anionic surface active agent selected from the group consisting of organic sulfates and organic sulfonates, said polyvalent metal salt and said anionic surface active agent each being present in an amount within the range of about 0.02 to about 0.20 part per 100 parts by weight of said polymerizable compounds, said granular polymer particles being capable of yielding a dry blend within about 60 minutes when 100 parts by weight thereof are blended with 100 parts of dioctyl phthalate plasticizer.

2. The process as defined by claim 1 of producing substantially uniform, discrete large particle size spheroidally-shaped granular polymer particles, wherein the ionizable polyvalent metal salt is a salt of a metal selected from the group consisting of magnesium, calcium, strontium, zinc, cadmium, barium, aluminum, tin, lead, antimony, titanium and zirconium.

3. The process as defined by claim 1 of producing substantially uniform, discrete large particle size spheroidally-shaped granular polymer particles, wherein the compound polymerized is vinyl chloride.

4. The process as defined by claim 1 of producing substantially uniform, discrete large particle size spheroidally-shaped granular polymer particles, wherein the compound polymerized is a mixture containing a vinyl ester of a lower fatty acid and at least about 80 percent by weight of vinyl chloride to produce a copolymer.

5. The process of claim 4 wherein the vinyl ester is vinyl acetate.

6. The process as defined by claim 1 of producing substantially uniform, discrete large particle size spheroidally-shaped granular polymer particles, wherein the compound polymerized is a mixture containing an allyl ester of a lower fatty acid and at least about 80 percent by weight of vinyl chloride to produce a copolymer.

7. The process as defined by claim 1 of producing substantially uniform, discrete large particle size spheroidally-shaped granular polymer particles, wherein the compound polymerized is a mixture containing a dialkyl ester of maleic acid and at least about 80 percent by weight of vinyl chloride to produce a copolymer.

8. The process of claim 7 wherein the dialkyl ester of maleic acid is dibutyl maleate.

9. The process as defined by claim 1 of producing substantially uniform, discrete large particle size spheroidally-shaped grandular polymer particles, wherein the compound polymerized is a mixture containing a dialkyl ester of fumaric acid and at least about 80 percent by weight of vinyl chloride to produce a copolymer.

10. The process as defined by claim 1 of producing substantially uniform, discrete large particle size spheroidally-shaped granular polymer particles, wherein the anionic surface active agent is employed in the form of a salt.

11. Substantially uniform, discrete, large particle size spheroidally-shaped granular polymer particles of a particle size of at least 80 mesh as produced, of a polymer of a compound selected from the group consisting of vinyl chloride and mixtures of at least 80 percent by weight of vinyl chloride with a member selected from the group consisting of (a) a vinyl ester of lower fatty acid, (b) an allyl ester of a lower fatty acid, and (c) a dialkyl ester of maleic and fumaric acids, said particles having a large effective surface area and being capable of yielding a dry blend within about 60 minutes when 100 parts by weight thereof are blended with 100 parts of dioctyl phthalate plasticezers, the resulting dry blend having a flow rate of at least 4 grams per second when passed through a 60° funnel having a one-half inch opening, said polymer particles being capable of dissolving rapidly at room temperature in cyclohexanone and in tetrahydrofuran, said polymer particles appearing as smooth uniform spheres when examined without magnification but when examined under magnification have a rough pitted surface, said polymer particles being produced in accordance with the process of claim 1.

References Cited in the file of this patent

UNITED STATES PATENTS

| 2,470,909 | Baer | May 24, 1949 |
| 2,580,277 | Boyd et al. | Dec. 25, 1951 |
| 2,647,103 | Griffith et al. | July 28, 1953 |
| 2,689,242 | Lucht | Sept. 14, 1954 |
| 2,689,836 | Bier | Sept. 21, 1954 |
| 2,823,200 | Longley et al. | Feb. 11, 1958 |

OTHER REFERENCES

Schildknecht: Polymer Processes, Interscience (1956), pages 69–109.

UNITED STATES PATENT OFFICE
CERTIFICATE OF CORRECTION

Patent No. 3,057,831                        October 9, 1962

Robert S. Holdsworth

It is hereby certified that error appears in the above numbered patent requiring correction and that the said Letters Patent should read as corrected below.

Column 7, line 6, for "of the" read -- of one of the --; column 8, line 43, for "bead plasticizer" read -- bead-plasticizer --; column 10, line 12, for "disobutyl" read -- diisobutyl --; line 14, for "or" read -- of --; column 12, line 46, for "grandular" read -- granular --; line 67, for "plasticezers" read -- plasticizer --.

Signed and sealed this 5th day of March 1963.

(SEAL)
Attest:

ESTON G. JOHNSON
Attesting Officer

DAVID L. LADD
Commissioner of Patents